(12) United States Patent
Patej

(10) Patent No.: US 7,136,095 B2
(45) Date of Patent: Nov. 14, 2006

(54) DIGITAL IMAGE SYSTEM AND METHOD FOR NOISE COMPENSATION

(75) Inventor: Edward Jerzy Patej, Aliso Viejo, CA (US)

(73) Assignee: Sharp Laboratories of America, Inc., Camas, WA (US)

( * ) Notice: Subject to any disclaimer, the term of this patent is extended or adjusted under 35 U.S.C. 154(b) by 762 days.

(21) Appl. No.: 10/161,358

(22) Filed: Jun. 3, 2002

(65) Prior Publication Data

US 2003/0222996 A1 Dec. 4, 2003

(51) Int. Cl.
*H04N 5/225* (2006.01)
*H04N 5/235* (2006.01)

(52) U.S. Cl. ............... 348/216.1; 348/229.1; 348/255

(58) Field of Classification Search ............ 348/216.1, 348/229.1, 241, 255, 216; 382/282, 233, 382/232; 375/245; 250/208.1
See application file for complete search history.

(56) References Cited

U.S. PATENT DOCUMENTS

| | | | | |
|---|---|---|---|---|
| 5,343,246 A | * | 8/1994 | Arai et al. | 348/363 |
| 5,473,369 A | * | 12/1995 | Abe | 348/169 |
| 5,717,464 A | * | 2/1998 | Perkins et al. | 375/240.05 |
| 5,926,224 A | * | 7/1999 | Nagasawa | 375/240.14 |
| 5,982,424 A | * | 11/1999 | Simerly et al. | 348/229.1 |
| 6,285,398 B1 | * | 9/2001 | Shinsky et al. | 348/223.1 |
| 2002/0044223 A1 | * | 4/2002 | Miller et al. | 348/571 |
| 2002/0080260 A1 | * | 6/2002 | Ojima | 348/348 |

FOREIGN PATENT DOCUMENTS

JP 2001313906 A * 11/2001

OTHER PUBLICATIONS

Written translation of JP2001-313906A.*

* cited by examiner

*Primary Examiner*—Ngoc Yen Vu
*Assistant Examiner*—Gregory Madden
(74) *Attorney, Agent, or Firm*—Law Office of Gerald Maliszewski; Gerald Maliszewski

(57) ABSTRACT

For a digital imaging device having automatic gain control, a system and method have been provided for noise compensation in low-light conditions. The method comprises: receiving digital image information; compressing the image information; supplying the compressed image information; monitoring an automatic gain control signal; comparing the monitored gain control signal to a predetermined threshold gain value; in response to monitoring a high gain control signal, selecting a low-light processing algorithm; and, in response to the low-light algorithm, controlling the volume of the supplied compressed image information. Selecting a low-light processing algorithm includes selecting an algorithm that limits decreases in the compression ratio by changing parameters in a compression algorithm. Alternately, the low-light processing algorithm, prior to compressing, filters noise from the received digital image information. Subsequent to filtering noise from the received digital information, an approximately constant compression ratio is maintained.

16 Claims, 2 Drawing Sheets

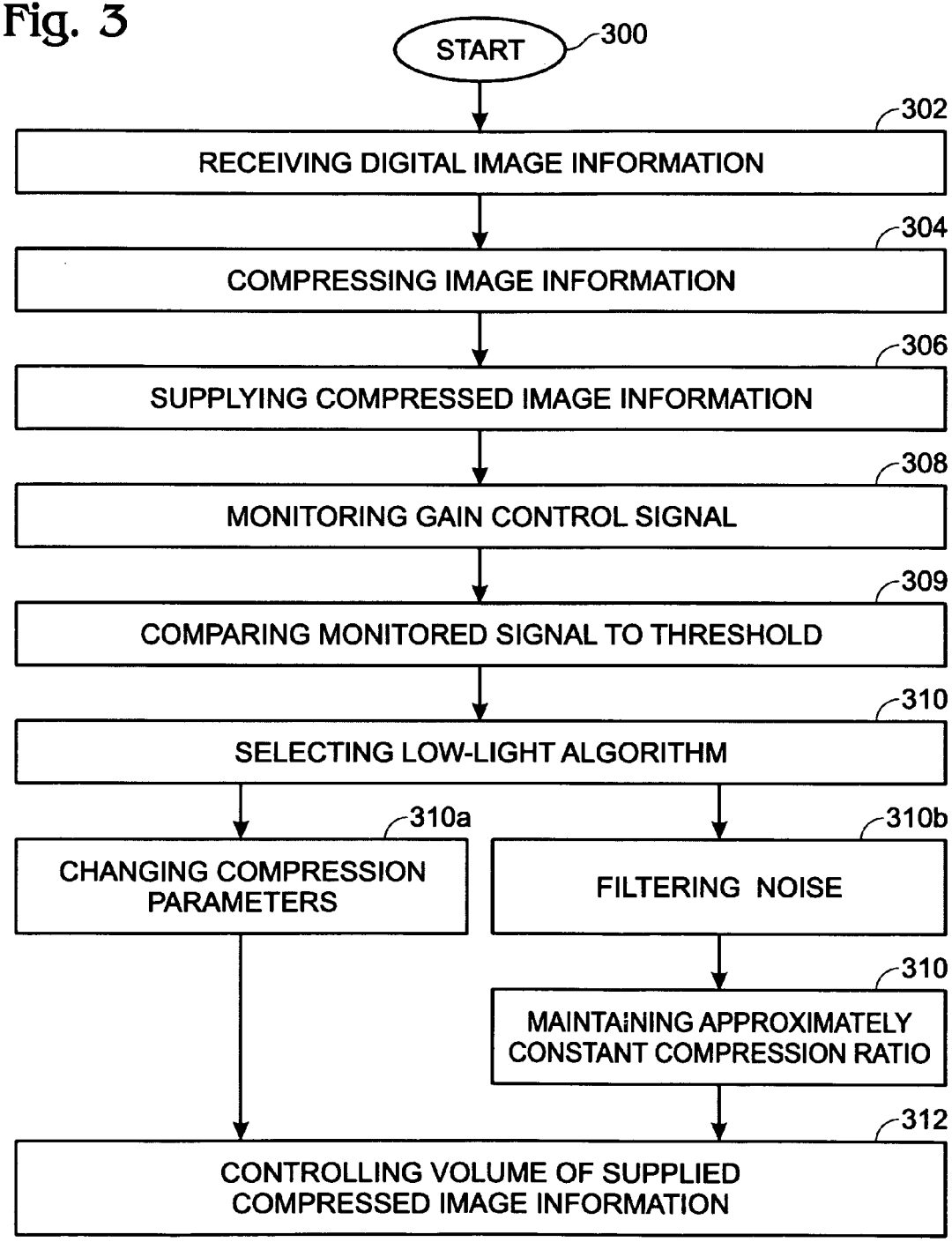

DIGITAL IMAGE SYSTEM AND METHOD FOR NOISE COMPENSATION

BACKGROUND OF THE INVENTION

1. Field of the Invention

This invention generally relates to digital image processes and, more particularly, to a system and method for limiting the volume of image information that is compressed when a camera with automatic gain control is operated near, or at full gain.

2. Description of the Related Art

The digital compression of images is becoming more and more popular with the rise of Internet and other bandwidth limited communications channels. There are currently many applications where images are being captured with a CCD, CMOS, or an analog output camera, digitized, compressed, and either sent live to recipients, or stored for future use.

Most conventional cameras implement an automatic gain control feature that permit images to be captured in varying light conditions. Unfortunately, when the gain is near, or at maximum gain, a certain amount of video noise is introduced to the captured image. Compression algorithms are less effective when an image contain a large amount of random noise. When compressed, the resulting output file is very large and contains noise as well as image information. The creation of the additional volume of compressed data is process intensive, without the benefit of adding useful information. In applications where the storage capacity or the bandwidth used to send the series of images through a communication channel is a precious commodity or is otherwise limited, the system suffers with increased storage requirements or communication delays without a corresponding benefit.

For example, when a video camera with automatic gain control and compression is deployed to record real-time images in an outdoor location, the output data initially consists of high quality images with little or no noise, and the compression ratio is high. As darkness falls, the camera gain increases to adapt to the new lighting conditions. The increase in camera gain results in an increase of video noise in the image, causing the compression ratio to drop and the size of the compressed data to grow. The increase in the amount of compressed data impacts storage requirements and communication delay without improving the image quality.

It is known for digital imaging processing equipment to implement image correction algorithms, or to adjust compression parameters in response to an analysis of the captured image information. However, such image analysis processes are computationally intensive and difficult to implement in real-time with economy.

It would be advantageous if a low-light compensation algorithm could be implemented without resort to a complex analysis of the image information.

It would be advantageous if the amount of digital image information that is compressed could be limited as a digital camera gain approaches the maximum value.

SUMMARY OF THE INVENTION

The present invention provides a mechanism to compensate for the increase of video noise that occurs under low-light conditions. The gain of a camera is continuously monitored and compared with the maximum gain of the camera. When the gain approaches maximum, the present invention algorithm either changes one or more parameters used to control compression ratio and output quality in the compression algorithm, or performs pre-processing lowpass image filter (smoothing) on the input image so that the resulting file size, or bitrate of the compressed data remains approximately the same.

Accordingly, in a digital imaging device having automatic gain control, a method is provided for noise compensation in low-light conditions. The method comprises: receiving digital image information; compressing the image information; supplying the compressed image information; monitoring an automatic gain control signal; comparing the monitored gain control signal to a predetermined threshold gain value; in response to monitoring a high gain control signal, selecting a low-light processing algorithm; and, in response to the low-light algorithm, controlling the volume of the supplied compressed image information.

Selecting a low-light processing algorithm includes selecting an algorithm that limits decreases in the compression ratio by changing parameters in a compression algorithm. Alternately, the low-light processing algorithm, prior to compressing, filters noise from the received digital image information. Subsequent to filtering noise from the received digital information, an approximately constant compression ratio is maintained.

In other aspects, monitoring the automatic gain control signal includes monitoring the gain control signal rate of change. Then, limiting decreases in the compression ratio includes variably limiting decreases in the compression ratio in response to variations in the rate of change. Alternately, the filter parameters are varied in response to variations in the rate of change.

Additional details of the above-described method, and digital imaging device having noise compensation in low-light conditions are provided below.

BRIEF DESCRIPTION OF THE DRAWINGS

FIG. 3 is a flowchart illustrating the present invention method for noise compensation in low-light conditions in a digital imaging device having automatic gain control.

DETAILED DESCRIPTION OF THE PREFERRED EMBODIMENTS

Figure 1:
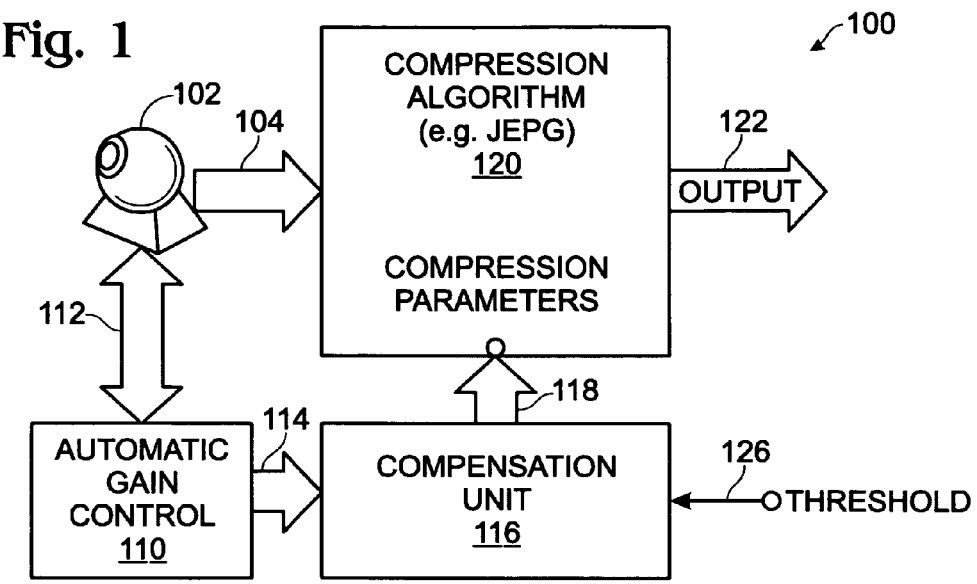
FIG. 1 is a schematic block diagram of the present invention digital imaging device having noise compensation in low-light conditions.

FIG. 1 is a schematic block diagram of the present invention digital imaging device having noise compensation in low-light conditions. The device 100 comprises a light sensing device 102 having an input to receive an image and an output on line 104 to supply digital image information. A gain control unit 110 has an input on line 112 to receive light exposure information. The gain control unit 110 automatically supplies a gain control signal on line 114 in response to the light exposure information. The gain control signal can either be an analog or digital signal.

A compensation unit 116 has an input on line 114 to monitor the gain control signal and an output on line 118 to supply a compensation signal in response to high gain control signals. A compression unit 120 accepts digital image information from the light sensing device 102 on line 104 and supplies compressed image information at an output on line 122 with a volume of data that is controlled in response to the compensation signal on line 118. The compressed image information can be stored and/or transmitted via a communications channel (not shown).

The compensation unit 116 has an input on line 126 to accept a predetermined threshold gain value. The compensation unit 116 supplies the compensation signal on line 118 in response to monitoring a gain control signal on line 114 approaching the threshold gain value supplied on line 126. The compression unit 120 limits the volume of the compressed image information on line 122, by changing parameters in a compression algorithm, in response to the compensation signal. As shown, the compression algorithm is JPEG. However, the present invention is not limited to JPEG compression and, in fact, can be used with most conventional image compression algorithms. As is well known in the art, each of these compression algorithms has a parameter, or set of parameters that can be adjusted to change the compression ratio (for example, quality setting), and so adjust the volume, the file size, or bitrate of the compressed data. In the interest of brevity the various compression algorithms, and the corresponding compression parameters, are not specifically presented. However, it would be within the skill of one practiced in the art to create a means for controlling the compression parameters in response to compensation signals.

In some aspects, the compensation unit 116 monitors the gain control signal rate of change on line 114 and changes the compensation signal on line 118 in response to the gain control signal rate of change. Then, the compression unit 120 variably limits the volume of the compressed image information in response to variations in the gain control signal rate of change. In this manner, rapid changes in gain are anticipated and the file size of compressed image information remains constant even in changing gain conditions.

Figure 2:
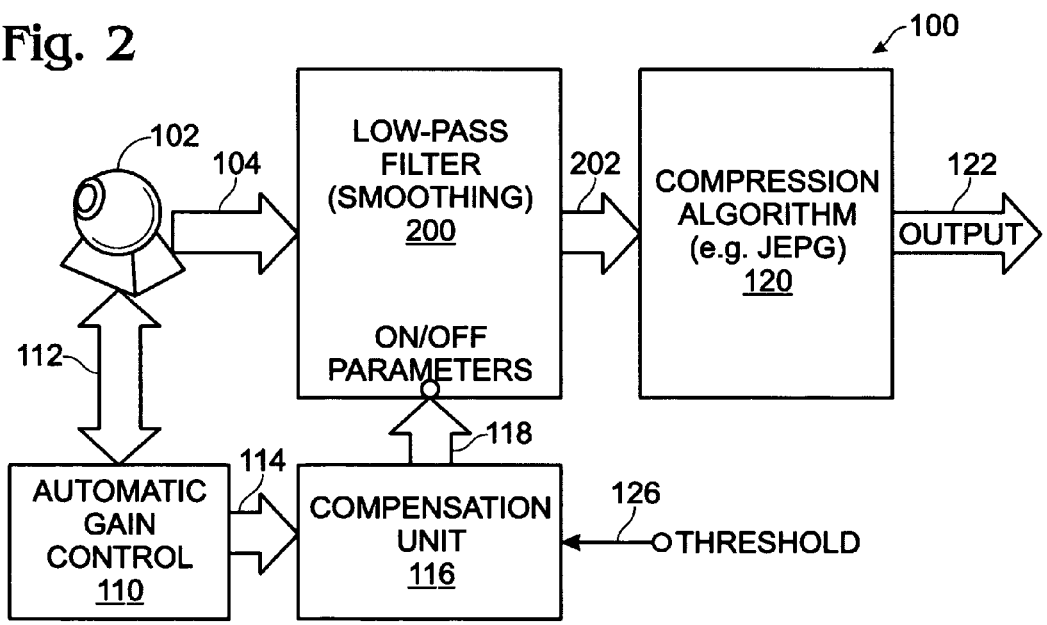
FIG. 2 is a schematic block diagram illustrating a variation of the present invention digital imaging device with low-light noise compensation.

FIG. 2 is a schematic block diagram illustrating a variation of the present invention digital imaging device with low-light noise compensation. The device 100 of FIG. 2 contains all the elements described above in the explanation of FIG. 1, which will not be repeated in the interest of brevity. In addition, the device 100 includes a noise reduction filter 200 having an input on line 104 to accept the digital image information from the light sensing device 102. The filter 200 has an output on line 202 to supply filtered digital image information to the compression unit 120 and an input on line 118 to accept the compensation signal for enabling the filtering.

In this aspect of the invention, noise is removed from the image information as the camera gain reaches maximum. As a result of adjusting the filter parameters, the compression algorithm parameters need not be adjusted as the device approaches maximum gain. Although the filtering low-light algorithm operates differently from the variation of FIG. 1, the end result is still that the volume of the compressed image information files is able to remain approximately constant when the device gain goes to maximum.

In some aspects, the compensation unit 116 monitors the gain control signal rate of change on line 114 and supplies a compensation signal on line 118 responsive to the monitored rate of change. The noise reduction filter 200 variably changes the filter parameters in response to variations in the gain control signal rate of change. Changes in gain are anticipated and the file size of compressed image information remains approximately constant even in changing gain conditions.

FIGS. 1 and 2 represent two extreme variations of the invention. In FIG. 1 the compressed image information volume is controlled, in low-light conditions, by changing parameters of the compression algorithm. In FIG. 2, the parameters of the compression algorithm can substantially remain constant because a filter is used to reduce the extra volume of input image information due to noise. However, hybrids of the two extremes can be enabled where a portion of the noise is removed with the filter in combination with a compression algorithm whose parameters are changed to a lesser extent than the variation of FIG. 1.

In one application that applies to both FIGS. 1 and 2, the light sensing device 102 supplies video image information. Then, the compression unit 120 compresses image information into I frames and P frames, and supplies controlled byte size I frames in response to the compensation signal.

FIG. 3 is a flowchart illustrating the present invention method for noise compensation in low-light conditions in a digital imaging device having automatic gain control. Generally, the flowchart corresponds to FIGS. 1 and 2. Although this method is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts at Step 300. Step 302 receives digital image information. Step 304 compresses the image information. Step 306 supplies the compressed image information. Step 308 monitors an automatic gain control signal. The gain control signal can be either an analog or digital signal. Step 310, in response to monitoring a high gain control signal, selects a low-light processing algorithm. Step 312, in response to the low-light algorithm, controls the volume of the supplied compressed image information.

In some aspects of the method, a further step, Step 309 compares the monitored gain control signal to a predetermined threshold gain value. Then, selecting a low-light processing algorithm in Step 310 includes selecting a low-light processing algorithm in response to the monitored gain control signal approaching the threshold gain value.

In other aspects, selecting a low-light processing algorithm in Step 310 includes optional variations. Step 310a limits decreases in the compression ratio by changing parameters in a compression algorithm. Alternately, Step 310b, prior to compressing, filters noise from the received digital image information. Then, subsequent to filtering noise from the received digital information, Step 310c maintains an approximately constant compression ratio.

In some aspects, monitoring the automatic gain control signal in Step 308 includes monitoring the gain control signal rate of change. Then, when the algorithm described by Step 310a is used, limiting decreases in the compression ratio includes variably limiting decreases in the compression ratio in response to variations in the rate of change. Alternately, if the algorithm of Step 310b is used, filtering noise from the received digital information includes varying the filter parameters in response to variations in the rate of change.

In other aspects of the method receiving digital image information in Step 302 includes receiving video image information. Then, compressing the image information in Step 304 includes compressing image information into I frames and P frames. Controlling the volume of the supplied compressed image information in Step 312 includes controlling the byte size of the I frames.

A system and method have been provided for controlling the volume of compressed image information that is either stored or communicated when a digital camera is operating near full gain. Examples have been given that either adjust the compression parameters or filter the image information before compression. However, the present invention can also combine algorithms. The present invention is not limited to use with any particular compression algorithm, communication format, storage format, or image format. Other variations and embodiments of the invention will occur to those skilled in the art.

I claim:

1. In a digital imaging device having automatic gain control, a method for noise compensation in low-light conditions, the method comprising:
   receiving digital image information;
   compressing the image information;
   supplying the compressed image information;
   monitoring an automatic gain control signal;
   in response to monitoring an automatic gain control signal below a high gain threshold, selecting a processing algorithm that increases compressed image information as the automatic gain control signal increases;
   in response to monitoring an automatic gain control signal above the high gain threshold, selecting a low-light processing algorithm; and,
   in response to selecting the low-light algorithm, limiting the volume of the supplied compressed image information.

2. The method of claim 1 wherein selecting a low-light processing algorithm includes selecting an algorithm from the group including:
   limiting the compression ratio by changing parameters in a compression algorithm; and,
   prior to compressing, filtering noise from the received digital image information.

3. The method of claim 2 wherein selecting a low-light processing algorithm further includes:
   subsequent to filtering noise from the received digital information, maintaining an approximately constant compression ratio.

4. The method of claim 2 wherein monitoring the automatic gain control signal includes monitoring the gain control signal rate of change; and,
   wherein limiting the compression ratio includes variably limiting the compression ratio in response to variations in the rate of change.

5. The method of claim 2 wherein monitoring the automatic gain control signal includes monitoring the gain control signal rate of change; and,
   wherein filtering noise from the received digital information includes varying the filter parameters in response to variations in the rate of change.

6. The method of claim 1 wherein monitoring the automatic gain control signal includes monitoring an analog gain control signal.

7. The method of claim 1 wherein monitoring the automatic gain control signal includes monitoring a digital gain control signal.

8. The method of claim 1 wherein receiving digital image information includes receiving video image information;
   wherein compressing the image information includes compressing image information into I frames and P frames; and,
   wherein limiting the volume of the supplied compressed image information includes limiting the byte size of the I frames.

9. In a digital imaging device having noise compensation in low-light conditions, the device comprising:
   a light sensing device having an input to receive an image and an output to supply digital image information;
   a gain control unit having an input to receive light exposure information, the gain control unit automatically supplying a gain control signal in response to the light exposure information;
   a compensation unit having an input to monitor the gain control signal, an input to accept a threshold gain value, and an output to supply a compensation signal in response to the gain control signals;
   a compression unit to accept digital image information from the light sensing device and supplying compressed image information at an output with a volume that is responsive to the compensation signal; and,
   where the compensation unit supplies a compensation signal to increase the volume of compressed image information as the gain control signal increases, when the gain control signal is below the threshold gain value, and a compensation signal to limit the volume of compressed image information, when the gain control signal exceeds the threshold gain value.

10. The device of claim 9 wherein the compression unit limits the volume of the compressed image information, by changing parameters in a compression algorithm, in response to the compensation signal.

11. The device of claim 10 wherein the compensation unit monitors the gain control signal rate of change and changes the compensation signal in response to the gain control signal rate of change; and,
    wherein the compression unit variably limits the volume of the compressed image information in response to variations in the gain control signal rate of change.

12. The device of claim 9 further comprising:
    a noise reduction filter having an input to accept the digital image information from the light sensing device, an output to supply filtered digital image information to the compression unit, and an input to accept the compensation signal for enabling the filtering.

13. The device of claim 12 wherein the compensation unit monitors the gain control signal rate of change and supplies a compensation signal responsive to the monitored rate of change; and,
    wherein the noise reduction filter variably changes the filter parameters in response to variations in the gain control signal rate of change.

14. The device of claim 9 wherein the gain control unit supplies an analog gain control signal.

15. The device of claim 9 wherein the gain control unit supplies a digital gain control signal.

16. The device of claim 9 wherein the light sensing device supplies video image information; and,
    wherein the compression unit compresses image information into I frames and P frames, and supplies controlled byte size I frames in response to the compensation signal.

* * * * *

UNITED STATES PATENT AND TRADEMARK OFFICE
CERTIFICATE OF CORRECTION

| | | |
|---|---|---|
| PATENT NO. | : 7,136,095 B2 | Page 1 of 1 |
| APPLICATION NO. | : 10/161358 | |
| DATED | : November 14, 2006 | |
| INVENTOR(S) | : Edward Patej | |

It is certified that error appears in the above-identified patent and that said Letters Patent is hereby corrected as shown below:

TITLE PAGE, ITEM (73)
The Assignee listed on page 1 of the patent is incorrect. The actual Assignee is:

Sharp Microelectronic of the Americas, a division of Sharp Electronics Corporation, a corporation of the state of New York.

Signed and Sealed this

Twenty-third Day of October, 2007

JON W. DUDAS
*Director of the United States Patent and Trademark Office*